(12) United States Patent
Huth et al.

(10) Patent No.: US 9,884,376 B2
(45) Date of Patent: Feb. 6, 2018

(54) MILLING BURR

(71) Applicant: August Rüggeberg GmbH & Co. KG, Marienheide (DE)

(72) Inventors: Nicolas Huth, Lindlar (DE); Hans-Jürgen Zimmer, Marienheide (DE); Thomas Plömacher, Marienheide (DE)

(73) Assignee: AUGUST RÜGGEBERG GMBH & CO. KG, Marienheide (DE)

( * ) Notice: Subject to any disclaimer, the term of this patent is extended or adjusted under 35 U.S.C. 154(b) by 378 days.

(21) Appl. No.: 14/759,767

(22) PCT Filed: Jan. 9, 2013

(86) PCT No.: PCT/EP2013/050284
§ 371 (c)(1),
(2) Date: Jul. 8, 2015

(87) PCT Pub. No.: WO2014/108180
PCT Pub. Date: Jul. 17, 2014

(65) Prior Publication Data
US 2015/0336185 A1 Nov. 26, 2015

(51) Int. Cl.
*B23C 5/10* (2006.01)

(52) U.S. Cl.
CPC .......... *B23C 5/10* (2013.01); *B23C 2210/086* (2013.01); *B23C 2210/326* (2013.01); *B23C 2222/84* (2013.01); *Y10T 407/1948* (2015.01)

(58) Field of Classification Search
CPC .... B23C 3/16; B23C 3/18; B23C 5/10; B23C 5/12; B23C 5/14; B23C 5/1009;
(Continued)

(56) References Cited

U.S. PATENT DOCUMENTS 62,123 A * 2/1867 Elgin ................. B23C 5/14
407/62
4,285,618 A * 8/1981 Shanley, Jr. ........ B23C 5/10
407/54
(Continued)

FOREIGN PATENT DOCUMENTS

DE 29912978 U1 10/1999
DE 20105015 U1 7/2001
FR 2972122 A1 9/2012

OTHER PUBLICATIONS

International Standard, ISO 7755-1, "Hardmetal burrs" International Organization for Standardization, pp. 1-12, Second Edition, Aug. 15, 2013.

*Primary Examiner* — Will Fridie, Jr.
(74) *Attorney, Agent, or Firm* — Browdy and Neimark, PLLC

(57) ABSTRACT

A milling burr for use in handheld machines has a shank and a cutting member of hard metal which is rigidly connected to said shank. The cutting member is provided with cutting teeth which extend in a first direction of twist. The cutting teeth are divided in cutting tooth portions by rows of tooth dividers extending in a second direction of twist. The cutting tooth portions and the tooth dividers are arranged one behind the other when seen in the peripheral direction in such a way that an overlap occurs in an in each case alternating manner when seen in the peripheral direction.

15 Claims, 4 Drawing Sheets

(58) Field of Classification Search
CPC ........ B23C 2210/084; B23C 2210/086; B23C 2210/40; B23C 2210/326; B23C 2210/486; B23C 2210/48; B23C 2220/20
See application file for complete search history.

(56) References Cited

U.S. PATENT DOCUMENTS

| | | | | |
|---|---|---|---|---|
| 4,721,421 | A * | 1/1988 | Klinger | B23C 5/10 407/116 |
| 5,626,444 | A * | 5/1997 | Campian | B23C 3/00 407/54 |
| 6,164,876 | A * | 12/2000 | Cordovano | B23C 5/10 407/59 |
| 6,234,725 | B1 * | 5/2001 | Campian | B23C 5/1009 407/54 |
| 8,366,354 | B2 * | 2/2013 | Davis | B23C 5/10 407/53 |
| 2008/0206000 | A1 * | 8/2008 | Sasu | B23C 3/18 407/29.13 |
| 2012/0009543 | A1 * | 1/2012 | Meier | A61B 17/1615 433/165 |
| 2015/0056027 | A1 * | 2/2015 | Azegami | B23C 5/1009 407/54 |
| 2015/0147127 | A1 * | 5/2015 | Shpigelman | B23C 5/10 407/54 |
| 2015/0173776 | A1 * | 6/2015 | Burke | A61B 17/1613 606/80 |
| 2015/0209054 | A1 * | 7/2015 | Atabey | A61B 17/1615 606/80 |
| 2016/0221094 | A1 * | 8/2016 | Wang | B23D 71/005 |
| 2017/0087647 | A1 * | 3/2017 | Stojanovski | B23C 5/10 |

* cited by examiner

MILLING BURR

FIELD OF THE INVENTION

The invention relates to a milling burr for use in handheld machines at a given direction of rotation about an axis of rotation, the milling burr comprising a shank; a cutting member which is rigidly connected to the shank, the cutting member having a number n of first, second, third cutting teeth extending in a first direction of twist and first, second, third, . . . rows of tooth dividers extending in a second direction of twist which is opposite to the first direction of twist, which tooth dividers each have a same length b in the direction of the axis of rotation and are formed in the first, second, third, . . . cutting teeth, and which tooth dividers divide the first, second, third, . . . cutting teeth in cutting tooth portions with in each case a first end and a second end and an in each case identical length a in the direction of the axis of rotation, with the cutting teeth and the rows of tooth dividers each being arranged at equal angular distances across the periphery of the cutting member; and cutting edges, cutting surfaces and clearance surfaces which are in each case formed on the first, second, third, . . . cutting teeth, with the cutting surfaces being arranged upstream of the cutting edges relative to the direction of rotation, and the clearance surfaces being arranged downstream of the cutting edges relative to the direction of rotation; and facets formed on the cutting teeth between the cutting edges and the clearance surfaces.

BACKGROUND OF THE INVENTION

In contrast to milling tools for use in machine tools, milling burrs according to the definition of DIN 8032 (corresponding to ISO 7755/1) are used in handheld working machines. When using milling tools in stationary machine tools, the process parameters are reproducible. When using milling burrs in handheld working machines, however, the process parameters are to a large extent influenced by the operator himself and show a stochastic distribution in use. Furthermore, protecting the operator's health is of vital importance. The operator's hand-arm-system should not be exposed to harmful vibrations, and precautions should be taken to prevent cut wounds caused by the chips produced by the milling burr. In order to guarantee an economic use of the milling burr, it must be ensured that the desired cutting process of the workpiece is performed as efficient as possible.

Milling burrs referred to as cylindrical round nose burrs and arch round nose burrs according to DIN 8032 are particularly popular for cutting steel materials. These types of milling burrs are applicable in the most universal fields of applications for handheld machining of steel materials.

It turned out that the conventional design of the milling burrs according to the generic type specified above requires improvement.

SUMMARY OF THE INVENTION

An object of the invention is to design a milling burr of the generic type in such a way as to achieve good manual controllability of the working machine including the milling burr as well as an outstanding steel cutting performance while minimizing both the level of vibrations the operator is exposed to and the risk of injury due to chip formation.

In a milling burr for use in handheld machines at a given direction of rotation about an axis of rotation, the milling burr comprising a shank; a cutting member which is rigidly connected to the shank, the cutting member having a number n of first, second, third cutting teeth extending in a first direction of twist and first, second, third, . . . rows of tooth dividers extending in a second direction of twist which is opposite to the first direction of twist, which tooth dividers each have a same length b in the direction of the axis of rotation and are formed in the first, second, third, . . . cutting teeth, and which tooth dividers divide the first, second, third, . . . cutting teeth in cutting tooth portions with in each case a first end and a second end and an in each case identical length a in the direction of the axis of rotation, with the cutting teeth and the rows of tooth dividers each being arranged at equal angular distances across the periphery of the cutting member, and cutting edges, cutting surfaces and clearance surfaces which are in each case formed on the first, second, third, . . . cutting teeth, with the cutting surfaces being arranged upstream of the cutting edges relative to the direction of rotation, and the clearance surfaces being arranged downstream of the cutting edges relative to the direction of rotation, and facets formed on the cutting teeth between the cutting edges and the clearance surfaces, this object is achieved by a milling burr wherein the cutting member is formed of hard metal, wherein facets are formed on the cutting teeth between the cutting edges and the clearance surfaces, wherein two first and second planes of rotation defined by one of the first end and the second end of a cutting tooth portion of a first cutting tooth accommodate at least 90% of the length a of each cutting tooth portion, which follows the in each case next cutting tooth portion when seen in the direction of rotation, of a third, fifth, . . . cutting tooth, and wherein in each case at least 90% of the length b of the tooth dividers formed in the second, fourth, . . . cutting tooth when seen in the direction of rotation is accommodated between the first and the second plane of rotation. Surprisingly, it turned out that the combination of facets, which had previously only been known from milling burrs used for machining aluminium, and a particular alternating arrangement of cutting tooth portions and tooth dividers results in a significant improvement within the scope of the above-specified object. The design according to the invention ensures that relative to the direction of rotation, only every second cutting tooth of each peripheral plane comes into engagement with the workpiece, with the result that the chips produced have a sufficient size to prevent adherence to the clothes or hands of the operator such that the risk of injuries is minimized. Furthermore, the number of cutting teeth is correspondingly higher, namely twice as high, so that the level of vibrations the operator is exposed to is reduced. If the overlap ratio of cutting tooth portions and tooth dividers in the direction of rotation is specified to be at least 90%, this means that the overlap ratio of alternating tooth dividers and cutting tooth portions, which ideally amounts to 100%, is, for many reasons, not always completely achievable in boundary regions. Due to the fact that in the peripheral direction, in other words in the direction of rotation of the cutting member, a cutting tooth portion and a tooth divider are formed in an alternating manner and that in the longitudinal direction of the cutting member, each cutting tooth is provided with alternating cutting tooth portions and tooth dividers, only every second cutting tooth portion of each peripheral plane comes into engagement during one revolution of the milling burr. When seen in the direction of the axis of rotation adjacent thereto, however, cutting tooth portions come into engagement which are configured in such a way that they are offset by one cutting tooth when seen in the peripheral direction. As a result—as already mentioned above—at a given number of n cutting teeth, only n/2 cutting tooth portions of any peripheral plane come into cutting engagement during one revolution of the milling burr while on an overall level, all cutting teeth, in other words n cutting teeth, come into cutting engagement which, as already mentioned above, results in the production of larger chips. The frequency of the cutting teeth engagements is however twice as high as the number of chips per revolution, with the result that the level of vibrations the operator is exposed to is minimized. Surprisingly, this led to an improvement of the milling burr within the scope of the above-specified object of cutting steel materials.

The optimal overlap ratio of cutting tooth portions and tooth dividers arranged one behind the other when seen in the peripheral direction, in other words in the direction of rotation is such that at least 95%, preferably 100% of the length a of cutting tooth portions of the third, fifth, . . . cutting tooth arranged one behind the other when seen in the direction of rotation is accommodated between the first and the second plane of rotation, and that at least 95%, preferably 100% of the length b of tooth dividers formed in the second, fourth, . . . cutting tooth and arranged one behind the other when seen in the direction of rotation is accommodated between the first and second plane of rotation.

Optimally, the milling burr is provided with an even number of cutting teeth and an even number of rows of tooth dividers. The cutting member of the milling burr has a cylindrical base body.

The cutting teeth and the rows of tooth dividers are arranged in such a way that when seen in the direction of the axis of rotation, a second plane of rotation is in each case followed by a first plane of rotation and vice versa.

The cutting angle $\alpha$ of the cutting surfaces is configured in such a way that the following applies: $-7° \geq \alpha \geq -13°$. The clearance angle $\beta$ of the clearance surfaces is configured in such a way that the following applies: $35° \leq \beta \leq 41°$. The facet is provided with a facet angle $\gamma$ to which the following applies: $12° \leq \gamma \leq 14°$.

The milling burr is provided with a number of cutting teeth n=12 and with a number of rows of tooth dividers m=n/2=6.

Finally, the milling burr is configured in such a way that its first direction of twist has a first angle of twist $\delta 1$ with regard to the axis of rotation and the second direction of twist has a second angle of twist $\delta 2$ with regard to the axis of rotation. These angles of twist $\delta 1$, $\delta 2$ are configured such that the following applies: $28° \leq \delta 1 = \delta 2 \leq 32°$.

Other features, details and advantages of the invention will become apparent from the ensuing description of an exemplary embodiment, taken in conjunction with the drawing.

DESCRIPTION OF THE PREFERRED EMBODIMENT

According to DIN 8032, the term "milling burr" is defined as a milling cutter having a cylindrical shank for use in handheld machines. The milling burr according to the invention described below consists of hard metal according to DIN 8032 at least in the region of its cutting member. The above-mentioned DIN standard corresponds to international standard ISO 7755/1. If standardized terminology exists, these terms will be used in the following description.

Figure 1:
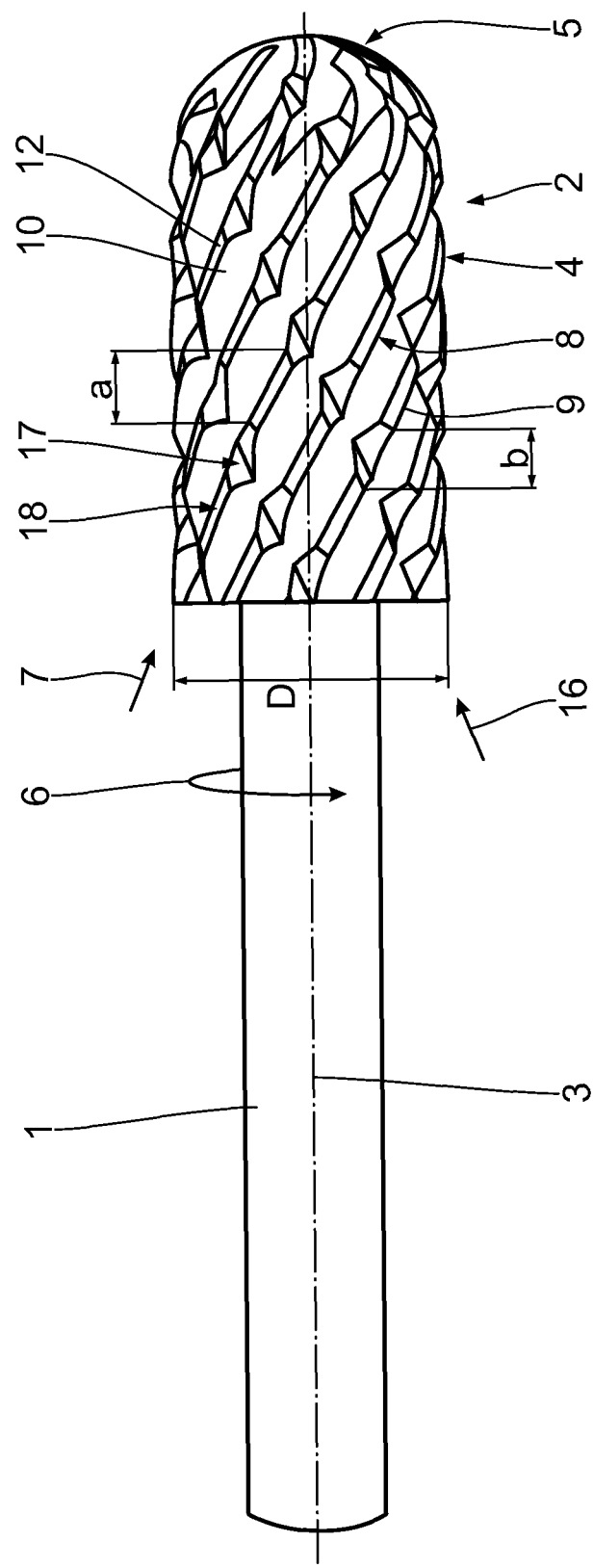
FIG. 1 shows a milling burr according to the invention in a lateral-longitudinal view.
Figure 2:
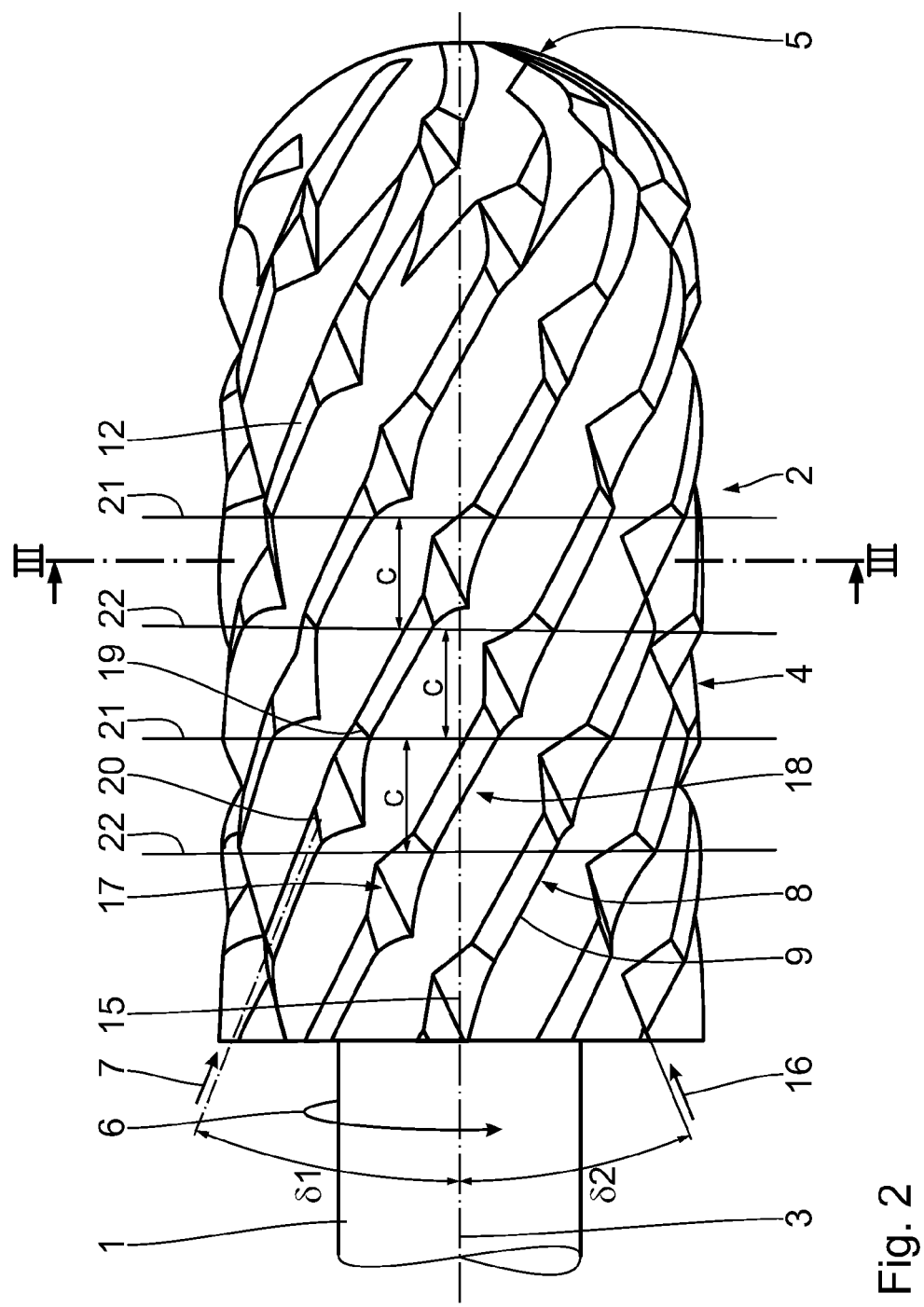
FIG. 2 an enlarged view of the cutting member of the milling burr according to FIG. 1.
Figure 3:
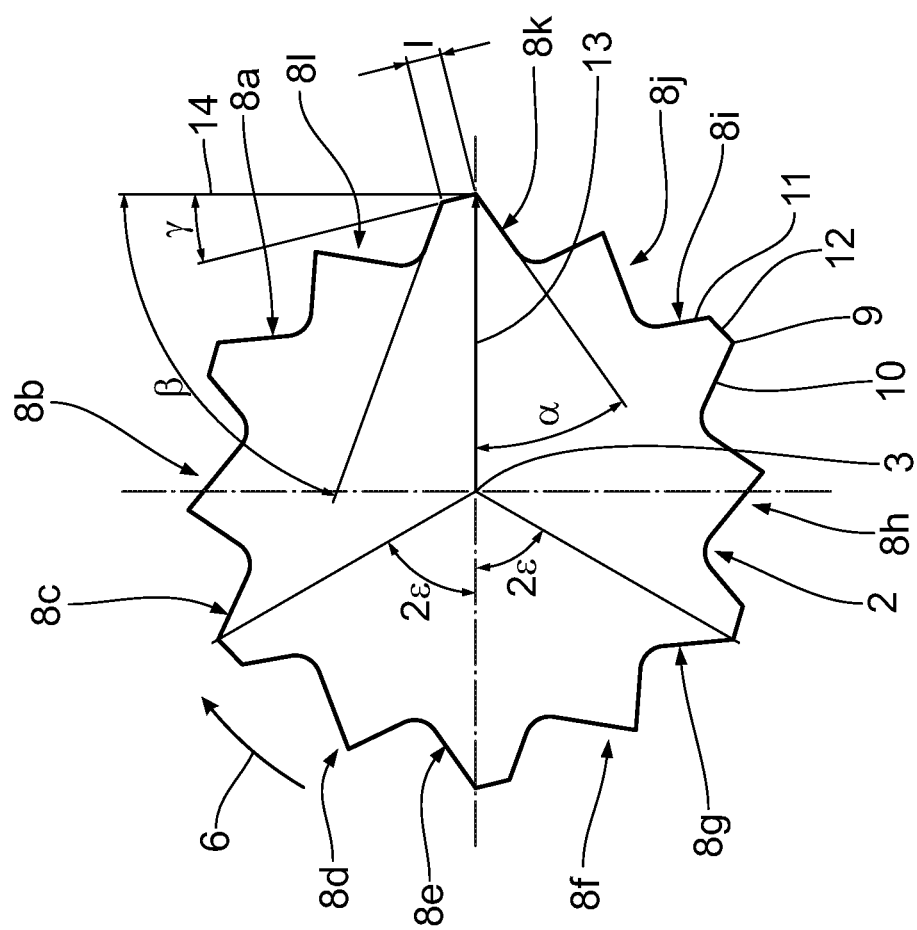
FIG. 3 a sectional view of the cutting member of the milling burr along sectional line III-III in FIG. 2, the Figure showing only the edge lines in the cutting plane but not the edge lines disposed behind the cutting plane, and FIG. 4 the use of a milling burr for machining a workpiece.

The milling burr shown in FIGS. 1 to 3 is a cylindrical round nose burr as standardized according to DIN 8032/3 (corresponding to ISO 7755/3). The milling burr has a shank 1 which is adapted for clamping in a handheld machine and a cutting member 2. Shank 1 and cutting member 2 are rotationally symmetric with respect to an axis of rotation 3. The cutting member 2 is always made of hard metal. The shank 1 may also be made of hard metal and is then formed in one piece with the cutting member 2. Alternatively and preferably, the shank 1 is made of steel and is connected to the cutting member 2 made of hard metal by soldering. The cutting member 2 of the cylindrical round nose burr has a base body 4 with a cylindrical basic shape and a head 5 which faces away from the shank 1 and has an approximately semi-spherical shape. The base body 4 has a diameter D.

The milling burrs are configured in such a way that they are driven to cut in a direction of rotation 6 which, when seen from the shank 1 towards the cutting member 2, corresponds to the clockwise direction of rotation.

The cylindrical base body 4 is provided with a number of n cutting teeth 8 which extend in a first direction of twist 7 and taper off towards the axis of rotation 3 at the head 5. In this exemplary embodiment, n=12 cutting teeth 8 are shown. It is advantageous if the number n is even. The first direction of twist 7 extends in the direction of rotation 6. The cutting teeth 8 have cutting edges 9 and, relative to the direction of rotation 6, cutting surfaces 10 arranged upstream thereof, i.e. in a leading manner. Clearance surfaces 11 are formed downstream of the cutting edges 9, i.e. in a trailing manner, when seen in the direction of rotation 6. Between each cutting edge 9 and the clearance surface 11 formed on the same cutting tooth 8, a so-called facet 12 is formed having a width 1 in the direction of rotation 6. As can be seen from FIG. 3, the cutting surface 10 forms a cutting angle a with a radius 13 extending through the axis of rotation 3. The clearance surface 11 forms a clearance angle $\beta$ with a tangent 14 to the cutting edge 9. The facet 12 forms a facet angle $\gamma$ with said tangent 14. In the first direction of twist 7, the cutting teeth 8 extend at a first angle of twist $\delta 1$ which is formed between the respective cutting edge 9 and a parallel 15 to the axis of rotation 3.

The cutting member 2 is provided with rows of tooth dividers 17 extending in a second direction of twist 16. For the sake of practical use, the number m of the rows of tooth dividers 17 is such that m=n/2, i.e. m=6, applies. The second direction of twist 16 extends opposite to the first direction of twist 7, in other words opposite to the direction of rotation 6, and forms an angle of twist $\delta 2$ with the mentioned parallel 15. The tooth dividers 17 have an approximately V-shaped cross-section and divide the cutting teeth 8 in cutting tooth portions 18. Seen from the shank 1, each of the cutting tooth portions 18 has a leading first end 19 and a trailing second end 20 between two tooth dividers 17 belonging to the same cutting tooth 8.

As explained by means of FIGS. 2 and 3, first and second planes of rotation 21, 22, which are spaced from but adjacent to each other in the direction of the axis of rotation 3, may be plotted through the cylindrical base body 4 of the cutting member 2. In the following description, the cutting teeth 8 are designated by 8a, 8b, . . . , 8l corresponding to their respective number n=12, which is shown only in FIG. 3. Due to the layout of FIG. 3 described above, the cutting teeth 8b, 8d, 8f, 8h and 8k are not immediately recognizable in FIG. 3 because of the tooth dividers 17 which are in each case shown in the cutting plane. The tooth divider 17 is however formed in the corresponding cutting tooth 8 . . . mentioned above. This is further illustrated by the fact that the reference lines extend only to the vicinity of the tooth divider 17.

The first plane of rotation 21 extends in each case through a first end 19 of a cutting tooth portion 18 of a first cutting tooth 8a and the cutting tooth 8 following the in each case next one, in other words the third, fifth, . . . , eleventh cutting tooth 8c, 8e, . . . 8k. The second plane of rotation 22 extends in each case through the second end 20 of a cutting tooth portion 18 of a second, fourth, . . . , twelfth cutting tooth 8b, 8d, . . . 8l. Between the two planes of rotation 21, 22, there is a tooth divider 17 which is in each case arranged on the second, fourth cutting tooth 8b, 8d, . . . , 8l between the cutting tooth portions 18 on the first, third, . . . , eleventh cutting tooth 8a, 8c, . . . , 8k. As can be seen from FIG. 3, the associated second, fourth, . . . , twelfth cutting tooth 8b, 8d, . . . , 8l is recessed radially inwards by the tooth divider 17 which is provided with a V-shaped notch. The cutting teeth 8 are arranged at equal angular distances of in each case ϵ. The tooth dividers 17 are also arranged at equal angular distances of in each case 2ϵ.

Figure 4:
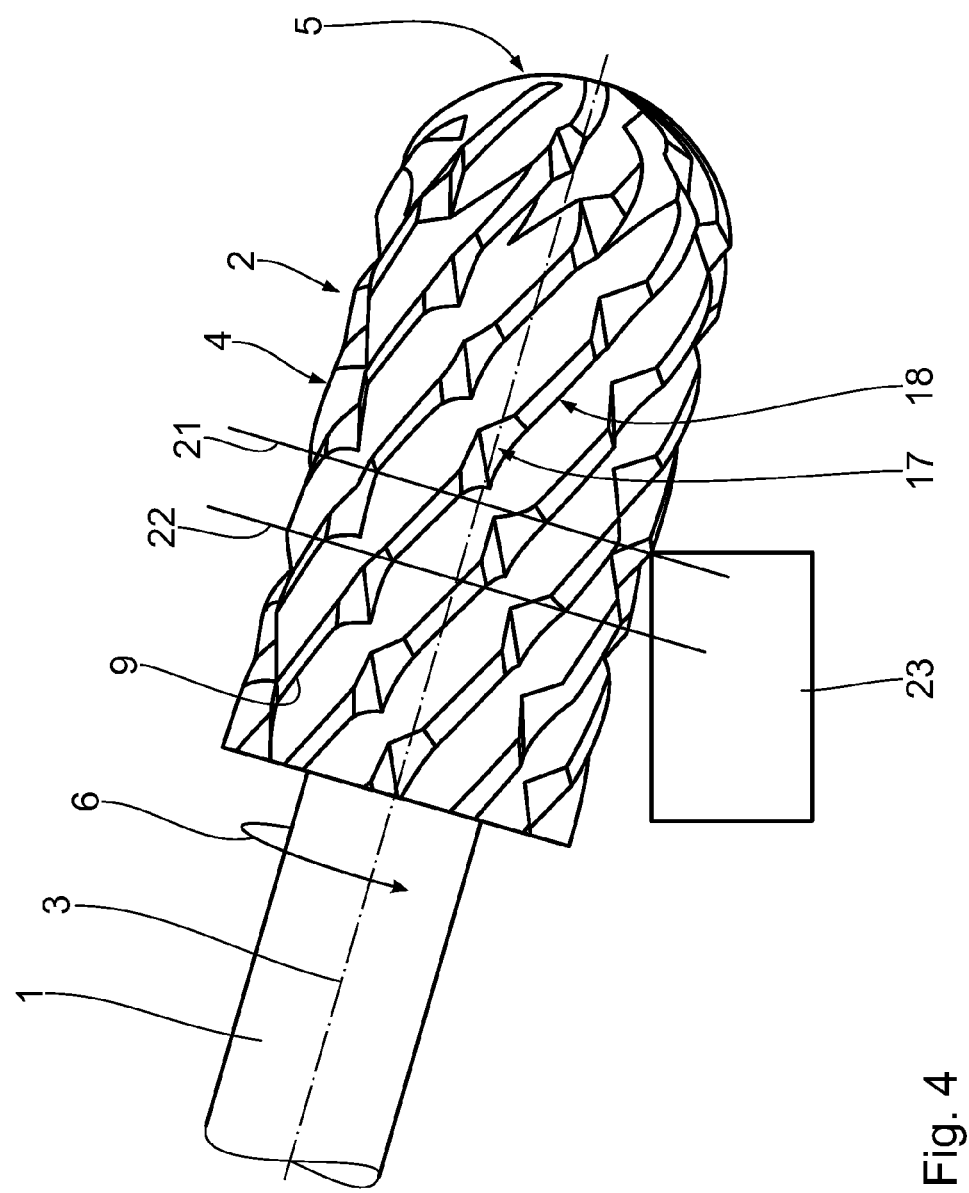

As can be seen from FIG. 4, the engagement and thus the cutting relationships a workpiece 23 is exposed to when the milling burr is used on a workpiece at varying angles are always the same. Between the two planes of rotation 21, 22 and the downstream planes of rotation 21, 22 which, as shown only in FIG. 2, are in each case arranged at equal distances c, only every second cutting tooth portion 18 comes into engagement at a particular point in time when seen in the direction of rotation 6.

Naturally, the above description also applies to a cylindrical milling burr which only differs from the cylindrical round nose burr described above in that it does not have an approximately semi-spherical head 5 but a plane front face as standardized according to DIN 8032/3 (corresponding to ISO 7755/2).

The following table contains the data of an exemplary embodiment of a milling burr according to the invention having a diameter D=12 mm.

| | |
|---|---|
| Number of cutting teeth 8 | 12 |
| Number m of the rows of tooth dividers 17 | 6 |
| First angle of twist δ1 | 28° to 32° |
| Second angle of twist δ2 | 28° to 32° |
| Cutting angle α | −7° to −13° |
| Clearance angle β | 35° to 41° |
| Facet angle γ | 12° to 14° |
| Facet width l | 0.7 mm |

What is claimed is:

1. A milling burr for use in handheld machines at a given direction of rotation about an axis of rotation, the milling burr comprising
a shank;
a cutting member which is rigidly connected to the shank, the cut-ting member having
a number n of first, second, third cutting teeth extending in a first direction of twist and
first, second, third, . . . rows of tooth dividers extending in a second direction of twist which is opposite to the first direction of twist, which tooth dividers each have a same length b in the direction of the axis of rotation and are formed in the first, second, third, . . . cutting teeth, and which tooth dividers)
divide the first, second, third, . . . cutting teeth in cutting tooth portions with in each case a first end and a second end and an in each case identical length a in the direction of the axis of rotation,
with the cutting teeth and the rows of tooth dividers each being arranged at equal angular distances across the periphery of the cutting member,
and
cutting edges, cutting surfaces and clearance surfaces which are in each case formed on the first, second, third, . . . cutting teeth, with
the cutting surfaces being arranged upstream of the cutting edges relative to the direction of rotation, and
the clearance surfaces being arranged downstream of the cut-ting edges relative to the direction of rotation,
and
facets formed on the cutting teeth between the cutting edges and the clearance surfaces,
wherein
the cutting member is formed of hard metal,
facets are formed on the cutting teeth between the cutting edges and the clearance surfaces,
two first and second planes of rotation defined by one of the first end and the second end, respectively, of a cutting tooth portion of a first cutting tooth accommodate at least 90% of the length a of each cutting tooth portion, which follows the in each case next cutting tooth portion when seen in the direction of rotation, of a third, fifth, . . . cutting tooth, and
in each case at least 90% of the length b of the tooth dividers formed in the second, fourth, . . . cutting tooth when seen in the direction of rotation is accommodated between the first and the second plane of rotation.

2. A milling burr according to claim 1, wherein 95% of the length a of cutting tooth portions of the third, fifth, . . . cutting tooth arranged one behind the other when seen in the direction of rotation is accommodated between the first and the second plane of rotation.

3. A milling burr according to claim 1, wherein 95% of the length b of tooth dividers formed in the second, fourth, . . . cutting tooth and arranged one behind the other when seen in the direction of rotation is accommodated between the first and second plane of rotation.

4. A milling burr according to claim 1, wherein 100% of the length a of cutting tooth portions of the third, fifth, . . . cutting tooth arranged one behind the other when seen in the direction of rotation is accommodated between the first and the second plane of rotation.

5. A milling burr according to claim 1, wherein 100% of the length b of tooth dividers formed in the second, fourth, . . . cutting tooth and arranged one behind the other when seen in the direction of rotation is accommodated between the first and second plane of rotation.

6. A milling burr according to claim 1, wherein an even number n of cutting teeth is provided.

7. A milling burr according to claim 1, wherein an even number m of rows of tooth dividers is provided.

8. A milling burr according to claim 1, wherein the cutting member has a cylindrical base body.

9. A milling burr according to claim 1, wherein the cutting teeth and the rows of tooth dividers are arranged in such a way that when seen in the direction of the axis of rotation, a second plane of rotation is in each case followed by a first plane of rotation and vice versa.

10. A milling burr according to claim 1, wherein the following applies to a cutting angle $\alpha$ of the cutting surfaces: $-7° \geq \alpha \geq -13°$.

11. A milling burr according to claim 1, wherein the following applies to a clearance angle $\beta$ of the clearance surface: $35° \leq \beta \leq 41°$.

12. A milling burr according to claim 1, wherein the following applies to a facet angle $\gamma$ of the facet: $12° \leq \gamma \leq 14°$.

13. A milling burr according to claim 6, wherein the following applies to the number n of the cutting teeth: n=12.

14. A milling burr according to claim 7, wherein the following applies to the number m of the rows of tooth dividers: m=n/2=6.

15. A milling burr according to claim 1, wherein the first direction of twist has a first angle of twist $\delta 1$ with regard to the axis of rotation, the second direction of twist has a second angle of twist $\delta 2$ with regard to the axis of rotation, and the following applies: $28° \leq \delta 1 = \delta 2 \leq 32°$.

* * * * *